United States Patent
Lection (10) Patent No.: US 9,361,941 B2
(45) Date of Patent: Jun. 7, 2016

(54) METHOD AND SYSTEMS FOR ARRANGING A MEDIA OBJECT IN A MEDIA TIMELINE

(75) Inventor: David B. Lection, Raleigh, NC (US)

(73) Assignee: Scenera Technologies, LLC, Portsmouth, NH (US)

( * ) Notice: Subject to any disclaimer, the term of this patent is extended or adjusted under 35 U.S.C. 154(b) by 1392 days.

(21) Appl. No.: 11/832,722

(22) Filed: Aug. 2, 2007

(65) Prior Publication Data

US 2009/0037818 A1 Feb. 5, 2009

(51) Int. Cl.
*G06F 17/30* (2006.01)
*G11B 27/034* (2006.01)

(52) U.S. Cl.
CPC ................... *G11B 27/034* (2013.01)

(58) Field of Classification Search
CPC .................................................. G11B 27/034
See application file for complete search history.

(56) References Cited

U.S. PATENT DOCUMENTS

| | | | |
|---|---|---|---|
| 5,819,273 A | 10/1998 | Vora et al. | |
| 6,075,537 A | 6/2000 | Adapathya et al. | |
| 6,208,988 B1 | 3/2001 | Schultz | |
| 6,351,765 B1 * | 2/2002 | Pietropaolo et al. | 709/218 |
| 6,564,263 B1 | 5/2003 | Bergman et al. | |
| 6,813,618 B1 | 11/2004 | Loui et al. | |
| 6,865,297 B2 | 3/2005 | Loui et al. | |
| 6,950,989 B2 | 9/2005 | Rosenzweig et al. | |
| 6,961,954 B1 | 11/2005 | Maybury et al. | |
| 6,970,859 B1 | 11/2005 | Brechner et al. | |
| 7,073,127 B2 | 7/2006 | Zhao et al. | |
| 7,076,503 B2 | 7/2006 | Platt et al. | |
| 7,117,453 B2 | 10/2006 | Drucker et al. | |
| 7,325,199 B1 * | 1/2008 | Reid | 715/723 |
| 7,480,694 B2 | 1/2009 | Blennerhassett et al. | |
| 7,769,819 B2 * | 8/2010 | Lerman et al. | 709/217 |
| 2001/0036356 A1 * | 11/2001 | Weaver et al. | 386/52 |
| 2003/0033296 A1 | 2/2003 | Rothmuller et al. | |
| 2003/0090507 A1 * | 5/2003 | Randall et al. | 345/731 |
| 2003/0167449 A1 | 9/2003 | Warren et al. | |
| 2004/0039837 A1 * | 2/2004 | Gupta et al. | 709/231 |
| 2004/0122539 A1 | 6/2004 | Ainsworth | |
| 2004/0225635 A1 | 11/2004 | Toyama et al. | |
| 2004/0268224 A1 | 12/2004 | Balkus et al. | |
| 2005/0015713 A1 | 1/2005 | Plastina et al. | |
| 2005/0044112 A1 | 2/2005 | Yamamoto et al. | |
| 2005/0108644 A1 | 5/2005 | Finke-Anlauff et al. | |

(Continued)

OTHER PUBLICATIONS

Paul Bausch, Yahoo! Hacks, Oct. 17, 2005, Published by O'Reilly Media, Inc.*
Jaffe, et al., "Generating Summaries and Visualization for Large Collections of GeoReferenced Photographs," MIR '06, Oct. 26-27, 2006, Santa Barbara, California, pp. 89-98.

(Continued)

*Primary Examiner* — Shew-Fen Lin (57) ABSTRACT

Methods and systems are described for arranging a media object in a media timeline. In one embodiment, a method includes presenting a graphical user interface including a media timeline for arranging a plurality of media objects in an order for presentation. The method includes receiving a selection of a portion of the media timeline representing a time period of presentation is received. The method also includes receiving a search term for association with the selected portion of the media timeline. The method further includes retrieving a media object according to a determination that the media object is related to the search term associated with the selected portion of the media timeline. The method still further includes arranging the retrieved media object in the selected portion of the media timeline for presentation during the represented time period.

20 Claims, 5 Drawing Sheets

(56) References Cited

U.S. PATENT DOCUMENTS

| | | |
|---|---|---|
| 2005/0165795 A1 | 7/2005 | Myka et al. |
| 2006/0224964 A1 | 10/2006 | Schwartz et al. |
| 2006/0224993 A1 | 10/2006 | Wong et al. |
| 2006/0242550 A1 | 10/2006 | Rahman et al. |
| 2007/0005571 A1 | 1/2007 | Brewer et al. |
| 2007/0050360 A1 | 3/2007 | Hull et al. |
| 2007/0101271 A1 | 5/2007 | Hua et al. |
| 2007/0130509 A1 | 6/2007 | Gombert et al. |
| 2007/0162839 A1* | 7/2007 | Danty et al. ............... 715/500.1 |
| 2007/0162855 A1* | 7/2007 | Hawk et al. .................. 715/730 |
| 2007/0240072 A1* | 10/2007 | Cunningham et al. ........ 715/764 |
| 2009/0007202 A1* | 1/2009 | Williams et al. .............. 725/105 |
| 2009/0055746 A1 | 2/2009 | Dimitrova et al. |

OTHER PUBLICATIONS

Toyama, et al., "Geographical Location Tags on Digital Images," MM'03, Nov. 2-8, 2003, Berkeley, California, USA, pp. 156-166.

Hua, et al., "Interactive Video Authoring and Sharing Based on Two-Layer Templates," HCM '06, Oct. 27, 2006, Santa Barbara, California, pp. 65-74.

Hua, et al., "LazyCut—Content-Aware Template-Based Video Authoring," MM'05, Nov. 6-11, 2005, Singapore, pp. 792-793.

Mills, et al., Shoebox: A Digital Photo Management System, AT&T Laboratories Cambridge, Oct. 2000, 8 pages.

Loui, et al., "A Software System for Automatic Albuming of Consumer Pictures," Proceedings of the Seventh ACM International Conference on Multimedia, pp. 159-162 (Oct. 1999).

* cited by examiner

Smart Selection Defaults

Choose Media Selection Priority

⊙ Duration Priority

[ 5.0 ]   Selection Duration of Each Media Item (Seconds)   502

○ Count Priority

[ 7 ]   Number of Media Items to Select Per Phase   504

Secondary Selection Priority:   506
- ⊙ Items that are Oldest
- ○ Items that are Newest
- ○ Items of Highest Relevance Handling of Insufficient Media Condition:   508
- ⊙ Lengthen Duration of Selected Items
- ○ Repeat Selected Items

[ Save ]   [ Cancel ]   510

FIGURE 5

METHOD AND SYSTEMS FOR ARRANGING A MEDIA OBJECT IN A MEDIA TIMELINE

BACKGROUND

Today's media presentation software offer tools that enable their users to construct media presentations including video sequences having a selection of multiple photographs and/or video clips. These tools allow the user to construct slide shows and videos, typically combining them with audio, to create a compelling multimedia presentation.

Most of today's tools offer the user a timeline-oriented user interface for the construction of the media presentation. A timeline is typically a horizontal band that contains time scale markings. In today's systems, the user typically drags content from a library of available content and drops it on the timeline using a pointing device. Once the desired content has been added to the timeline, a media presentation can be rendered. The resulting media presentation is made available to the user for playback or can be published for sharing to other friends and family.

The drag-and-drop interface, while easy to use for simple applications, becomes very cumbersome if the user has large amounts of media spread across multiple libraries. The user must drag each content item to the timeline, and then arrange the content within the timeline prior to rendering.

SUMMARY

Methods and systems are described for arranging a media object in a media timeline. In one embodiment, a method includes presenting a graphical user interface including a media timeline for arranging a plurality of media objects in an order for presentation. The method includes receiving a selection of a portion of the media timeline representing a time period of presentation is received. The method also includes, receiving a search term for association with the selected portion of the media timeline. The method further includes retrieving a media object according to a determination that the media object is related to the search term associated with the selected portion of the media timeline. The method still further includes arranging the retrieved media object in the selected portion of the media timeline for presentation during the represented time period.

According to an aspect, a system for arranging a media object in a media timeline is disclosed. The system includes means for presenting a graphical user interface including a media timeline for arranging a plurality of media objects in an order for presentation. The system also includes means for receiving a selection of a portion of the media timeline representing a time period of presentation. The system further includes means for receiving a search term for association with the selected portion of the media timeline. The system still further includes means for retrieving a media object according to a determination that the media object is related to the search term associated with the selected portion of the media timeline. The system also includes means for arranging the retrieved media object in the selected portion of the media timeline for presentation during the represented time period.

According to another aspect, a system for arranging a media object in a media timeline is disclosed. The system includes a timeline rendering component configured for presenting a graphical user interface including a media timeline for arranging a plurality of media objects in an order for presentation. The system also includes a selection input component configured for receiving a selection of a portion of the media timeline representing a time period of presentation and for receiving a search term for association with the selected portion of the media timeline. The system further includes a media retriever component configured for retrieving a media object according to a determination that the media object is related to the search term associated with the selected portion of the media timeline. The system still further includes a timeline content manager component configured for arranging the retrieved media object in the selected portion of the media timeline for presentation during the represented time period.

According to still another aspect, a computer readable medium including a computer program, executable by a machine, for arranging a media object in a media timeline is disclosed. The computer program includes executable instructions for presenting a graphical user interface including a media timeline for arranging a plurality of media objects in an order for presentation. The computer program includes executable instructions for receiving a selection of a portion of the media timeline representing a time period of presentation. The computer program includes executable instructions for receiving a search term for association with the selected portion of the media timeline. The computer program includes executable instructions for retrieving a media object according to a determination that the media object is related to the search term associated with the selected portion of the media timeline. The computer program includes executable instructions for arranging the retrieved media object in the selected portion of the media timeline for presentation during the represented time period.

BRIEF DESCRIPTION OF THE DRAWINGS

Objects and advantages of the present invention will become apparent to those skilled in the art upon reading this description in conjunction with the accompanying drawings, in which like reference numerals have been used to designate like or analogous elements, and in which.

DETAILED DESCRIPTION

Figure 1:
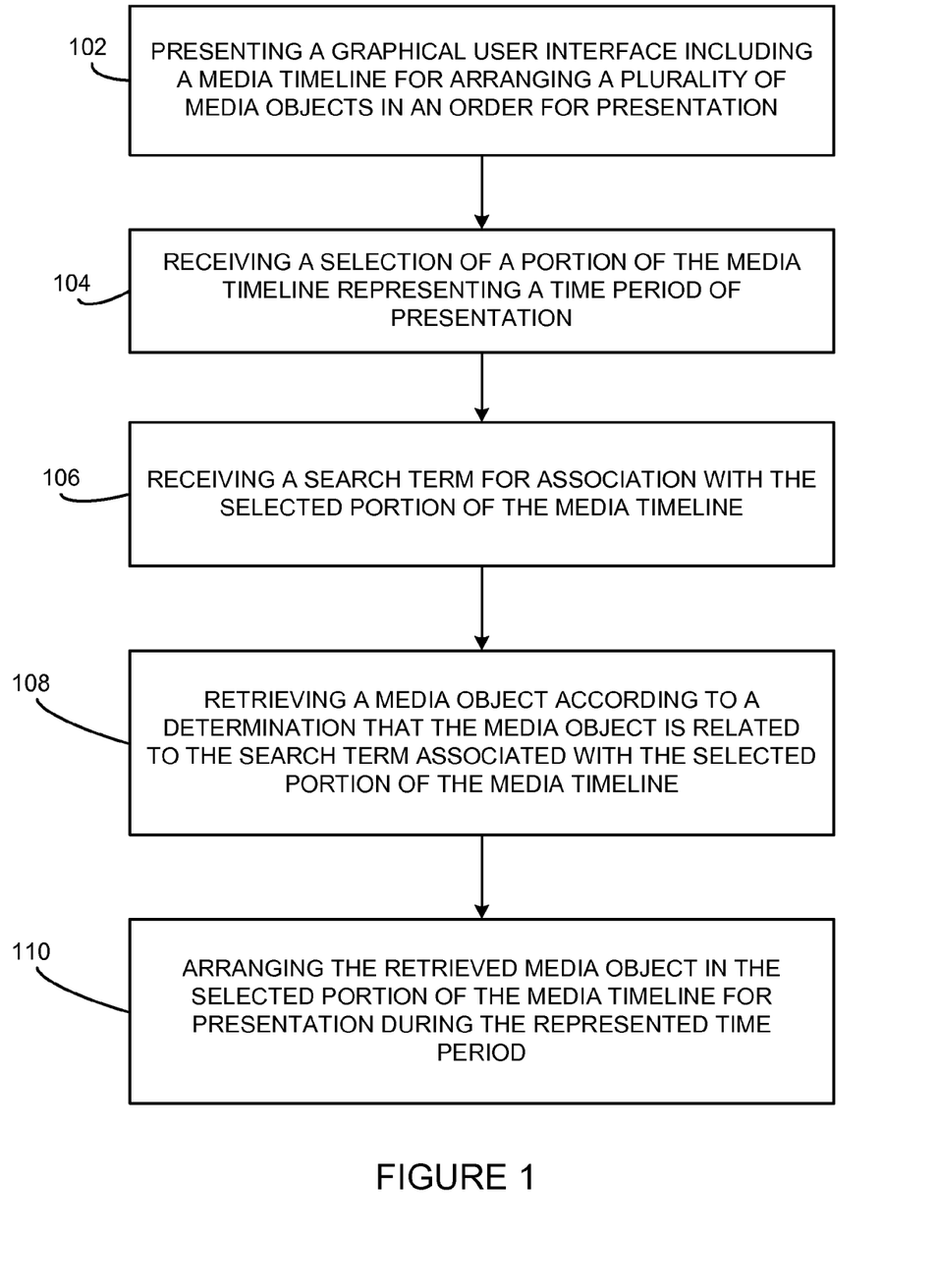
FIG. 1 is a flow diagram illustrating a method for arranging a media object in a media timeline according to an embodiment of the subject matter described herein.
Figure 2:
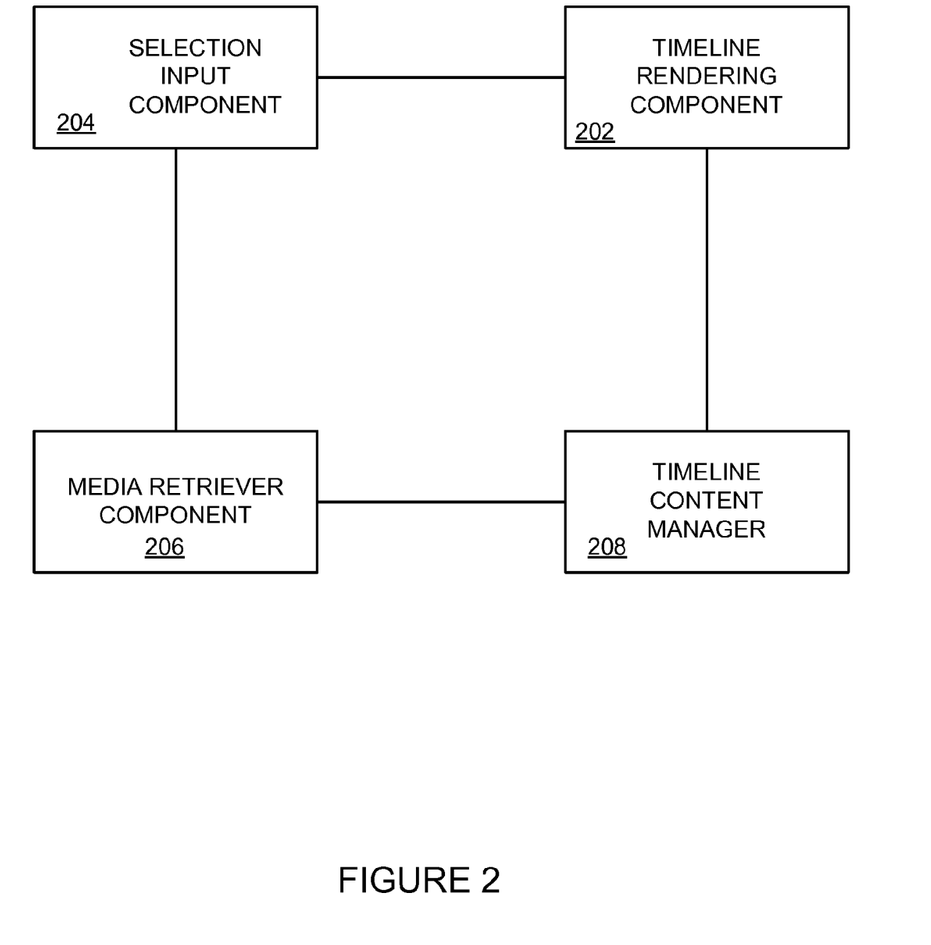
FIG. 2 is a block diagram illustrating a system for arranging a media object in a media timeline according to another embodiment of the subject matter described herein.

FIG. 1 is a flow diagram illustrating a method for arranging a media object in a media timeline according to an exemplary embodiment of the subject matter described herein. FIG. 2 is a block diagram illustrating a system for arranging a media object in a media timeline according to another exemplary embodiment of the subject matter described herein. The method illustrated in FIG. 1 can be carried out by, for example, some or all of the components illustrated in the exemplary system of FIG. 2.

Figure 3:
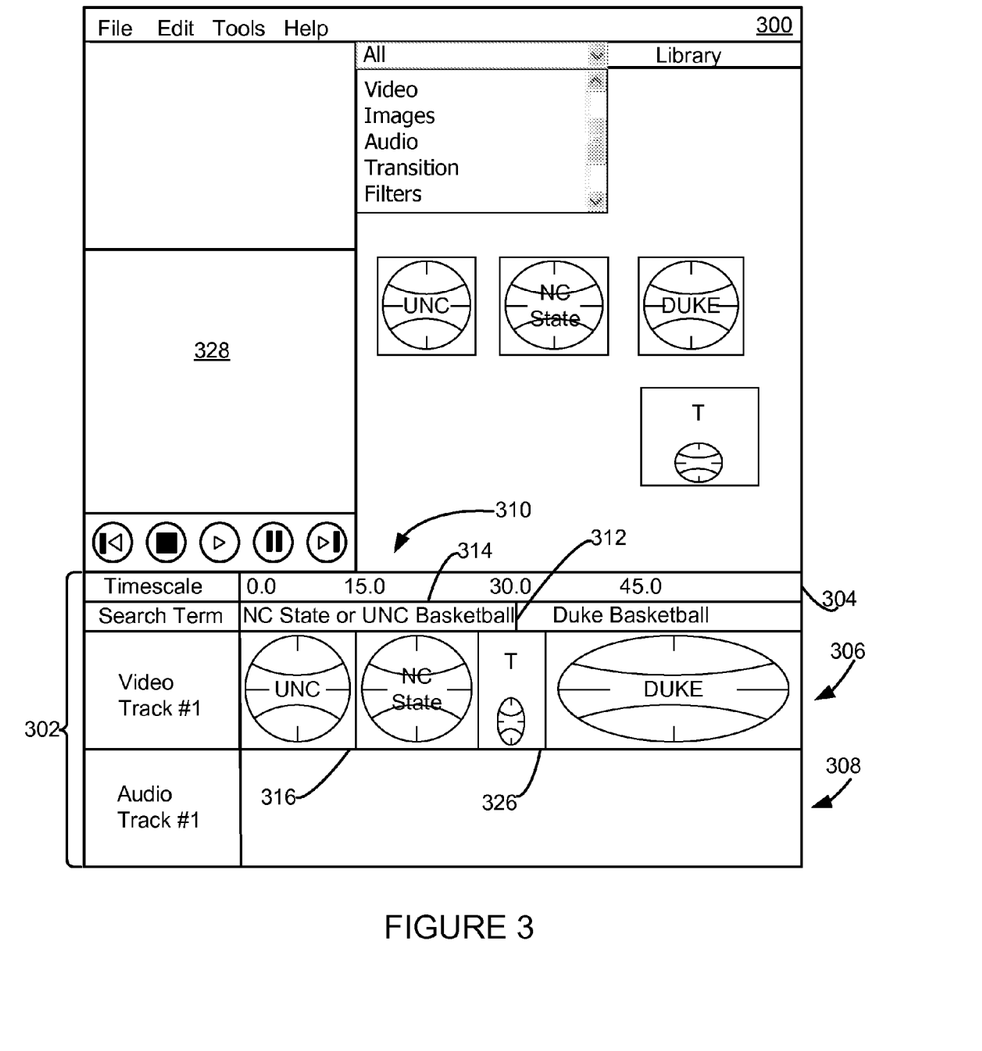
FIG. 3 illustrates an exemplary graphical user interface (GUI) for arranging a media object in a media timeline according to another embodiment of the subject matter described herein.

With reference to FIG. 1, in block 102 a GUI is presented. The GUI includes a media timeline for arranging a plurality of media objects in an order for presentation. Accordingly, a system for arranging a media object in a media timeline includes means for presenting a GUI including a media timeline for arranging a plurality of media objects in an order for presentation. For example, as illustrated in FIG. 2, a timeline rendering component 202 is configured for presenting a GUI including a media timeline for arranging a plurality of media objects in an order for presentation. FIG. 3 illustrates an exemplary GUI 300 including an exemplary media timeline 302 for arranging a plurality of media objects in an order for presentation.

The GUI 300 allows a user to create a media presentation. A media presentation can be any presentation that includes visual content, audio content, or both. Some examples of media presentations that can be created include recorded television shows, music videos, DVD-based movies, or any other presentation including visual content, audio content, or both. An exemplary media presentation creation process can begin by identifying media to be added to the media presentation. The media objects can include video clips, audio clips, images and photos, and other media objects including media content. The media timeline 302 can include a timescale 304 representing a time associated with the media presentation.

According to an aspect, the media timeline 302 can include a plurality of regions 306,308 for arranging media object components of varying classes for generating a multimedia presentation including the media object components. For example, the timeline rendering component 202 can be configured for presenting the media timeline 302 including the plurality of regions 306,308 for arranging media object components of varying classes. The media object components of varying classes are used in generating a multimedia presentation. Each region 306,308 corresponds to a class of media object components included in the multimedia presentation. For example, the first region 306 corresponds to a video class of media objects. Thus, the first region 306 can include video media objects. The second region 308 corresponds to an audio class of media objects. Thus, the second region 308 can include audio media objects.

Returning to FIG. 1, in block 104 a selection of a portion of the media timeline is received. The portion of the media timeline represents a time period of presentation. Accordingly, a system for arranging a media object in a media timeline includes means for receiving a selection of a portion of the media timeline representing a time period of presentation. For example, as illustrated in FIG. 2, a selection input component 204 is configured for receiving a selection of a portion of the media timeline representing a time period of presentation.

The selection input component 204 can be configured for receiving a selection of a portion of the media timeline 302 in a variety of ways. For example, the selection input component 204 can be configured to detect that a pointing device having a corresponding system pointer has been activated (or clicked) while the system pointer in a location within a portion of the media timeline. Upon detecting the click, the selection input component 204 can determine the coordinates of the system pointer. The selection input component 204 can determine the left edge and the right edge of the selected portion based on the determined coordinates. For example, as illustrated in FIG. 3, the left edge of the selected portion can be either the starting position of the media timeline 302 at time 0.0 in the timescale 304, or, if a previous selection phrase has been defined, the left edge of the selected portion can be at the right edge of the previously selected portion. The right edge of the new selected portion can be at the coordinates of the system pointer when the click is detected. For example, the right edge of the selected portion 310 occurs at the 30.0 mark of the timescale 304 as shown by a separator 312. Once the left and right edges of the selected portion have been determined, a vertical line can be drawn in the media timeline 302 to indicate the right border of the selected portion. For example, separator 312 illustrates an exemplary vertical line separator.

Returning to FIG. 1, in block 106 a search term is received for association with the selected portion of the media timeline. Accordingly, a system for arranging a media object in a media timeline includes means for receiving a search term for association with the selected portion of the media timeline. For example, as illustrated in FIG. 2, the selection input component 204 is configured for receiving a search term for association with the selected portion of the media timeline. According to an aspect, a search term can be metadata for the selected portion of the media timeline.

The selection input component 204 can be configured for receiving a selection of a portion of the media timeline in a variety of ways. For example, a selection phrase rendering component 402, illustrated in FIG. 4, can be configured to display a text entry field within the selected portion of the media timeline. FIG. 3 illustrates an exemplary text entry field 314 within a selected portion of the media timeline. A search term can be entered into the text entry field 314. For example, a search term of "UNC basketball" can represent a request to return any media object that is associated with the phrase "UNC basketball." For example, a media object 316 can be retrieved as it is associated with the search term "UNC basketball." For example, the media object 316 can include metadata that is associated with the search term "UNC basketball." Specific metadata fields can also be searched. For example, a search term "Father=Joe Smith" can represent a request to return any media object that includes a metadata tag "Father" that includes the phrase "Joe Smith."

According to an aspect, a search parameter defining a scope of a search for retrieving a media object based on the search term can be received. For example, the selection input component 204 can be configured for receiving a search parameter defining a scope of a search for retrieving a media object based on the search term. For example, a user can specify where to search for the media object in the search parameter. The user may request a search of local files, remote files, and/or the Internet to search for media objects. Multiple local and remote drives can be searched. Search terms may also include an "internet:" prefix as a search parameter. The "internet" prefix search parameter can represent a request for the search to be performed on the Internet. For example, a search term of "internet:UNC basketball" can represent a request to return any media object found in a search of the Internet that is associated with the phrase "UNC basketball." Other searches may be entered, and the system can also support a plug-in architecture that allows the search capabilities to be expanded.

Returning to FIG. 1, in block 108 a media object is retrieved according to a determination that the media object is related to the search term associated with the selected portion of the media timeline. Accordingly, a system for arranging a media object in a media timeline includes means for retrieving a media object according to a determination that the media object is related to the search term associated with the selected portion of the media timeline. For example, as illustrated in FIG. 2, a media retriever component 206 is configured for retrieving a media object according to a determination that the media object is related to the search term associated with the selected portion of the media timeline.

The media retriever component 206 can be configured for retrieving a media object in a variety of ways. For example, the media retriever component 206 can be configured to parse metadata associated with a media object to determine whether the metadata associated with the media object is associated with the search term. Further, any form of analysis of a media object may be undertaken to determine whether the media object is associated with the search term. For example, date analysis of the media object can be used to determine a time period associated with the media object for use in determining if the media object is associated with the search term. Further, the contents within the media object can be recognized. For example, recognition of individuals using facial or other types of human subject recognition, including audio analysis of human voices, can be used to determine whether the media object is associated with the search term.

Figure 4:
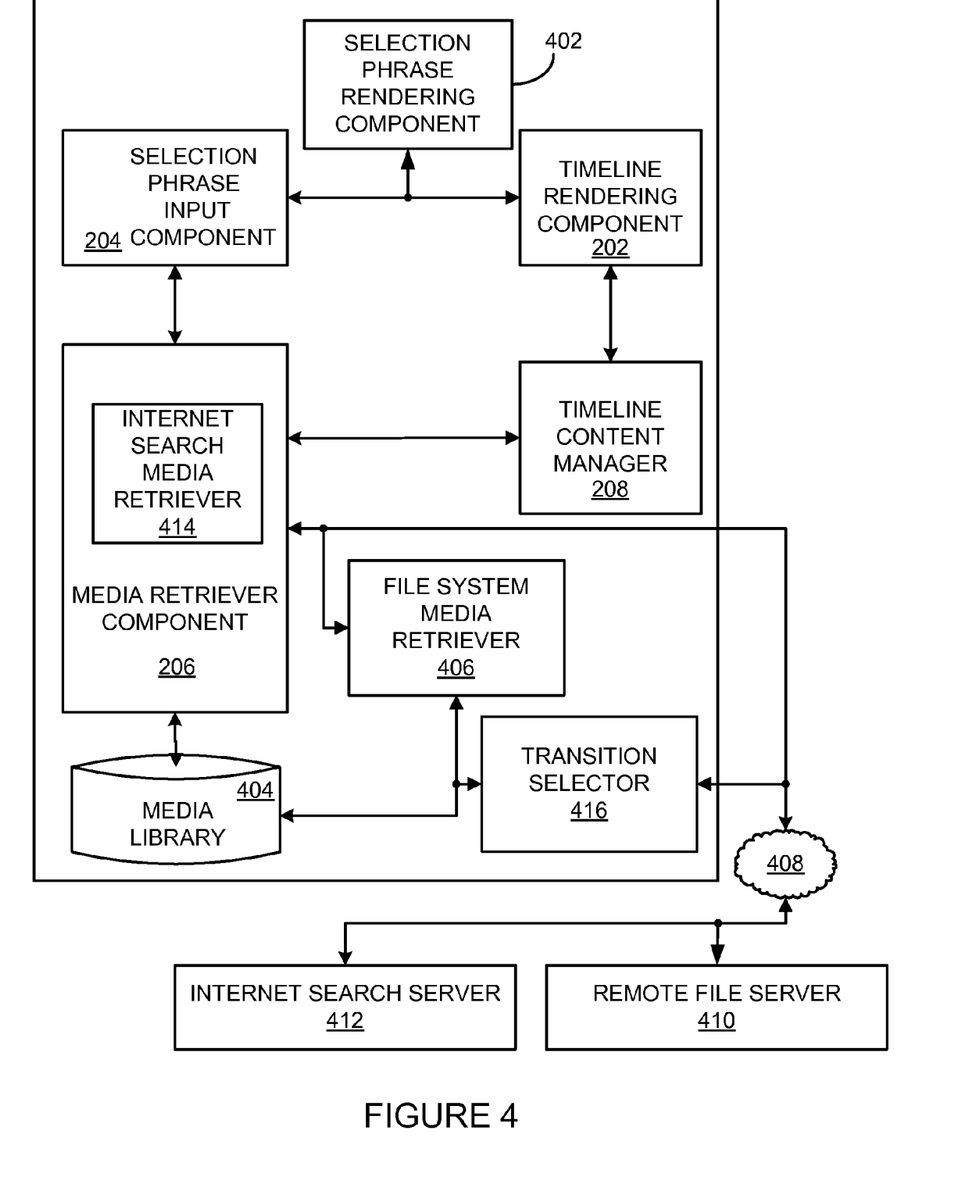
FIG. 4 is a block diagram illustrating a system for arranging a media object in a media timeline according to another embodiment of the subject matter described herein.

Further, the media retriever component 206 can be configured to search a media library component 404 for a media object that is associated with the search term. According to an aspect, when a search parameter is received, retrieving a media object includes performing a search for a media object related to the search term. The search can be performed according to the search parameter. For example, the media retriever component 206 can be configured for performing a search of the media library component 404 for a media object related to the search term.

According to an aspect, the media retriever component 206 can construct a search query for each local and remote file system and each internet search engine. For an internet search engine, a query follows a syntax that is acceptable and optimal for the search engine. For example a search of videos available on GOOGLE™ for "UNC basketball" can be represented as follows:

http://images.google.com/images?hl=en&q=UNC+basketball&btnG=Search+videos

According to an aspect, the media retriever component 206 can communicate with a file system media retriever component 406 that is configured for searching for media objects in local storage, such as the media library component 404 using the generated search query. In another aspect, the file system media retriever component 406 can be configured for searching for media objects in remote file-system storage to be included in the media presentation.

As illustrated in FIG. 4, the media retriever component 206 can be connected through a network 408 to a remote file server 410 and an internet search server 412. These remote servers may include media objects that can be retrieved. In another aspect, the media retriever component 206 can include an internet search media retriever component 414 that can be configured for searching for media objects using the generated search query in an internet search engine. The internet search media retriever component 414 can be configured to call the internet search server 412 and receive, from the internet search server 412, a list of uniform resource locators (URLs) representing media objects found in the search that conforms to the search expression.

According to an aspect, a media presentation can contain transitions. A transition can be a video object, an audio object, and in some cases both an audio-based and video-based media object that provides a segue between adjacent media content items in the media timeline 302. The transition joins the media content items together and transitions the user's attention from the first media content item to the second media content item. Some examples of visual transitions include fade-out/fade-in and a horizontal screen wipe, where the video image of second media object "pushes" the video image of the first media object off the screen in a given direction.

According to an aspect, a transition media object can be retrieved according to a determination that the transition media object is related to the search term associated with the selected portion of the media timeline and metadata associated with a second portion of the media timeline adjoining the selected portion of the media timeline. For example, a transition selector component 416 can be configured for retrieving a transition media object according to a determination that the transition media object is related to the search term associated with the selected portion of the media timeline and metadata associated with an adjoining portion of the media timeline adjoining the selected portion of the media timeline.

The transition selector component 416 can be configured to retrieve the search term from the selected portion of the media timeline and metadata associated with an adjoining portion of the media timeline. The search term and the metadata can be combined and reduced to extract a common search term. According to an aspect, the metadata associated with the adjoining portion of the media timeline 302 can be a search term associated with the adjoining portion of the media timeline 302. As illustrated in FIG. 3, a search term associated with the selected portion of the media timeline, "NC State or UNC Basketball," and metadata associated with an adjoining portion of the media timeline, "Duke Basketball," can be reduced to the common search term of "Basketball." The search term can be used by the transition selector component 416 to search for a transition that is associated with the common search term or theme. For example, the transition selector component 416 can be configured to search the media library component 404 for a transition that is associated with the theme "Basketball."

According to an aspect, the transition media object can be arranged in the media timeline between the selected portion of the media timeline and the adjoining portion of the media timeline. For example, the timeline content manager component 208 can be configured for arranging the transition media object in the media timeline between the selected portion of the media timeline and the adjoining portion of the media timeline.

For example, the transition selector component 416 can return the retrieved transition media object to the timeline content manager component 208 to add the transition between the selected portion of the media timeline and the adjoining portion of the media timeline. The transition media object can be inserted into the timeline as shown in FIG. 3, where transition media object 326 separates two portions of the media timeline. Once the transition media object is inserted, the media timeline display can be updated to show the inserted transition media object. The transition media object will be included in the content the next time the presentation created with the media timeline is played or rendered.

Returning to FIG. 1, in block 110 the retrieved media object is arranged in the selected portion of the media timeline for presentation during the represented time period. Accordingly, a system for arranging a media object in a media timeline includes means for arranging the retrieved media object in the selected portion of the media timeline for presentation during the represented time period. For example, as illustrated in FIG. 2, a timeline content manager component 208 is configured for arranging the retrieved media object in the selected portion of the media timeline for presentation during the represented time period.

The timeline content manager component 208 can be configured to maintain a list of media objects in the media timeline. Each media object in the media timeline 302 can be assigned a start time and a duration in the media timeline. Each media object can be arranged on the media timeline 302 in a continuous track based on the content. The media timeline 302 can include a representation of each media object, such as an iconic rectangle, that can be associated with the content of the media object. For longer video media objects, a series of frames may be used to represent the media object in the media timeline 302, with each frame extracted from the media object at the proper time in the media corresponding to the time on the media timeline 302. For example, media object 316 is illustrated as arranged at the beginning of the selected portion 310 of the media timeline 302.

According to an aspect, a determination that a time period associated with the retrieved media object is not equal to the time period of presentation represented by the selected portion of the media timeline can be made. In response to the determination, at least one of the retrieved media object and the selected portion of the media presentation can be modified such that the time period associated with the retrieved media object equals the time period of presentation. For example, the timeline content manager component 208 can be configured for determining that a time period associated with the retrieved media object is not equal to the time period of presentation represented by the selected portion of the media timeline 302. In response to the determination, the timeline content manager component 208 can be configured for modifying at least one of the retrieved media object and the selected portion of the media presentation, such that the time period associated with the retrieved media object equals the time period of presentation.

For example, if the time period associated with the retrieved media object is greater than the time period of presentation, then the retrieved media object can be modified. The timeline content manager component 208 can be configured to select a portion of the content included in the retrieved media object equal in time to the time period of presentation. If the time period of the retrieved media object is longer than the time period of presentation, then the media object can be clipped such that the earliest portion of the video that matches the time period of presentation will be selected. The timeline content manager component 208 can be configured to alter the frame rate of playback of the content of the retrieved media object such that the time period associated with the retrieved media object equals the time period of presentation.

Alternatively or in addition to the arrangement described above, the timeline content manager component 208 can be configured to modify the selected portion of the timeline 302. For example, the timeline content manager component 208 can be configured to increase or decrease the time period of the selected portion of the timeline 302, such that the time period of presentation is equal to the time period associated with the retrieved media object. When the time period of a selected portion of the media timeline 302 is increased, the area of the selected portion can be expanded. For example, the area of the selected portion can be shifted to the right to add additional area to the selected portion. Any other media objects in the timeline 302 can be shifted to the right in the media timeline 302 such that the media objects remain adjacent to the selected portion of the media timeline 302. When the time period of a selected portion of the media timeline 302 is decreased, the area the selected portion can be contracted to the left. Any adjacent media objects in the media timeline 302 can be shifted to the left in the timeline 302 so they are immediately adjacent to the selected portion of the timeline 302. If the time period associated with the retrieved media object is less than the time period of presentation, then the timeline content manager component 208 can be configured to slow the frame rate of playback of the media object or to repeat a portion of the media object during playback to occupy remaining time in the selection phrase region. Alternatively, the media object can be repeated during playback to occupy any remaining time in the selected portion of the media timeline.

Figure 5:
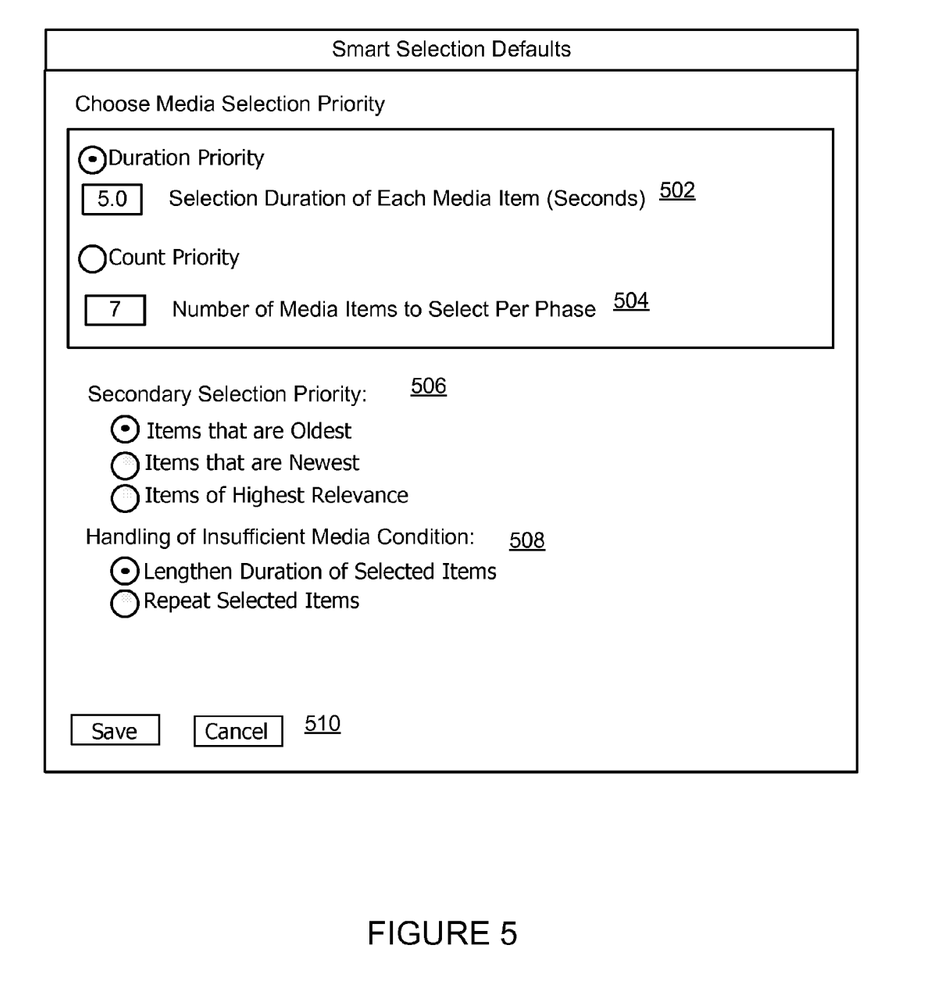
FIG. 5 illustrates an exemplary GUI for specifying preferences for use in arranging a media object in a media timeline according to another embodiment of the subject matter described herein.

According to an aspect, a count of media objects and/or a duration representing a time period less than the time period of presentation can be received for association with the selected portion of the media timeline 302. For example, the selection input component can be configured for receiving at least one of a count of media objects and a duration representing a time period less than the time period of presentation for association with the selected portion of the media timeline 302. FIG. 5 illustrates an exemplary user preferences dialog including a duration selection area 502 and a count selection area 504, allowing respective specification of a duration priority and a count priority for selection of media objects. When count priority is specified in the count selection area 504, a specific number of media objects can be specified. When duration priority is specified in the duration selection area 502, a specified number of media objects are selected based on time periods associated with the media objects. Another selection area 508 provides an option to handle insufficient media by lengthening the duration of selected items or repeating selected items.

According to an aspect, the timeline content manager component 208 can be configured to arrange the retrieved media object in the selected portion of the media timeline 302 according to a user preference. For example, a user can specify in an area 506 user preferences dialog that media objects be arranged newest first, oldest first, highest relevance (of the search) first, or any other manner selected by the user. The timeline content manager component 208 can be configured to first sort, and then arrange the objects, based on the user preference in a first list. From this first list, a second list can be selected for the media timeline 302 that, when added to the timeline 302, will contain content for the duration of the selected portion of the media timeline 302.

When a count or duration is received, a plurality of media objects can be retrieved according to at least one of the count of media objects and the duration. Each of the retrieved media objects is related to the search term. For example, the media retriever component 206 can be configured for retrieving a plurality of media objects according to at least one of the count of media objects and the duration. The plurality of media objects are retrieved in the same manner as described above with regard to block 108. According to an aspect, if the retrieved media objects exceed the time scale within the visible window of the video editing tool, a horizontal scroll bar can be added to the window to allow the user to scroll the window across the length of the media in the timeline 302.

According to an aspect, a determination is made that a time period associated with the retrieved plurality of media objects is not equal to the time period of presentation represented by the selected portion of the media timeline 302. In response to the determination, at least one of the selected portion of the media timeline 302 and one or more of the plurality of retrieved media objects can be modified, such that the time period associated with the plurality of retrieved media objects is equal to the time period of presentation.

For example, the timeline content manager component 208 can be configured for determining that a time period associated with the retrieved plurality of media objects is not equal to the time period of presentation represented by the selected portion of the media timeline 302. In response to the determination, the timeline content manager component 208 can be configured for modifying at least one of the selected portion of the media timeline 302 and one or more of the plurality of retrieved media objects. As a result, the time period associated with the plurality of retrieved media objects is equal to the time period of presentation. Examples of modifying a media object and modifying the selected portion of the media timeline 302 are described above.

According to an aspect, a portion of the plurality of retrieved media objects can be selected, such that a time period associated with the selected portion of the plurality of retrieved media objects does not exceed the time period of presentation. For example, the timeline content manager component 208 can be configured for selecting a portion of the plurality of retrieved media objects, such that the time period associated with the selected portion of the plurality of retrieved media objects does not exceed the time period of presentation.

According to an aspect, when a media object that includes both audio and video content is arranged in the media timeline 302, the content of the media object can be represented in multiple regions in the timeline. As media is retrieved, the media retriever component 206 can be configured to analyze the content of the media object for the types of media components present in the media object. A representation of each media component in the media object can be passed to the timeline content manager 208. The timeline content manager 208 places the representation of the video content of the media object in the first region 306 and the representation of the audio content of the media object is placed in the second region 308. While these components are represented in the media timeline 302 separately, the components are aligned at the same time period in the media timeline 302, such that the components are in synchronization when the media presentation represented by the media timeline 302 is played.

Once the desired media objects have been added and arranged in the media timeline 302, the user may play the media presentation represented by the media timeline 302. A video window component 328 illustrates an exemplary video window that can be configured to present the content of the presentation as it is played. According to an aspect, playback can begin from the left most position in the timeline, and, as the content is rendered in the video window, a line can be displayed along the media timeline showing the current time position of the presentation.

If the user is satisfied with the layout of the content in the media timeline 302, then the user can render and export the created media presentation. The contents of the media timeline 302 can be rendered in the video and audio resolutions as specified by the user. Different applications for presenting media presentations can require different formats. For example if the media presentation is intended to be added to a DVD, then the user could pick a 720×480 resolution for the video content, with, perhaps, DOLBY DIGITAL™ audio settings for the audio and MPEG-2 formatting. In another example, if the media presentation were being exported to the Web, then a 320×240 resolution could be used for the video content and low resolution audio can be used for the audio to keep the size of the resulting media file from growing prohibitively large.

It should be understood that the various components illustrated in the various block diagrams represent logical components that are configured to perform the functionality described herein and may be implemented in software, hardware, or a combination of the two. Moreover, some or all of these logical components may be combined, some may be omitted altogether, and additional components can be added while still achieving the functionality described herein. Thus, the subject matter described herein can be embodied in many different variations, and all such variations are contemplated to be within the scope of what is claimed.

To facilitate an understanding of the subject matter described above, many aspects are described in terms of sequences of actions that can be performed by elements of a computer system. For example, it will be recognized that the various actions can be performed by specialized circuits or circuitry (e.g., discrete logic gates interconnected to perform a specialized function), by program instructions being executed by one or more processors, or by a combination of both.

Moreover, executable instructions of a computer program for carrying out the methods described herein can be embodied in any machine or computer readable medium for use by or in connection with an instruction execution machine, system, apparatus, or device, such as a computer-based or processor-containing machine, system, apparatus, or device, that can read or fetch the instructions from the machine or computer readable medium and execute the instructions.

As used here, a "computer readable medium" can be any medium that includes, stores the computer program for use by or in connection with the instruction execution machine, system, apparatus, or device. The computer readable medium can be, for example, but is not limited to, an electronic, magnetic, optical, electromagnetic, infrared, or semiconductor machine, system, apparatus, device, or medium. More specific examples (a non-exhaustive list) of the computer readable medium can include the following: a portable computer diskette, a random access memory (RAM), a read only memory (ROM), an erasable programmable read only memory (EPROM or Flash memory), a portable compact disc (CD), a portable digital video disc (DVD), and the like.

Thus, the subject matter described herein can be embodied in many different forms, and all such forms are contemplated to be within the scope of what is claimed. It will be understood that various details of the invention may be changed without departing from the scope of the claimed subject matter. Furthermore, the foregoing description is for the purpose of illustration only, and not for the purpose of limitation, as the scope of protection sought is defined by the claims as set forth hereinafter together with any equivalents thereof entitled to.

What is claimed is:

1. A method for arranging a media object in a media timeline, the method comprising:

presenting a graphical user interface including a media timeline for arranging a plurality of media objects in an order for presentation;

receiving a selection of a portion of the media timeline representing a time period of presentation;

receiving, in a text entry field within the selected portion of the media timeline, a search term for association with the selected portion of the media timeline;

retrieving a media object according to a determination that the media object is related to the search term associated with the selected portion of the media timeline; and automatically, in response to retrieving the media object, arranging the media object in the selected portion of the media timeline based on the selection of the portion of the media timeline representing the time period of presentation for presentation of the media object during time period of presentation.

2. The method of claim 1 including retrieving a transition media object according to a determination that the transition media object is related to the search term associated with the selected portion of the media timeline and metadata associated with a second portion of the media timeline adjoining the selected portion of the media timeline.

3. The method of claim 2 including arranging the transition media object in the media timeline between the selected portion of the media timeline and the adjoining portion of the media timeline.

4. The method of claim 1 including receiving a search parameter defining a scope of a search for retrieving the media object based on the search term, wherein retrieving the media object includes performing the search for the media object related to the search term, the search performed according to the search parameter.

5. The method of claim 1 including:
   determining that a time period associated with the media object is not equal to the time period of presentation represented by the selected portion of the media timeline; and
   automatically modifying at least one of the media object and the selected portion of the media timeline based on the selection of the portion of the media timeline representing the time period of presentation such that the time period associated with the media object equals the time period of presentation.

6. The method of claim 1 including:
   receiving at least one of a count of media objects and a duration representing a time period less than the time period of presentation for association with the selected portion of the media timeline; and
   retrieving a plurality of media objects according to at least one of the count of media objects and the duration, wherein each of the retrieved media objects is related to the search term.

7. The method of claim 6 including:
   determining that a time period associated with the retrieved plurality of media objects is not equal to the time period of presentation represented by the selected portion of the media timeline; and
   modifying at least one of the selected portion of the media timeline and one or more of the plurality of retrieved media objects such that the time period associated with the plurality of retrieved media objects is equal to the time period of presentation.

8. The method of claim 6 including:
   determining that a time period associated with the retrieved plurality of media objects is not equal to the time period of presentation represented by the selected portion of the media timeline; and
   selecting a portion of the plurality of retrieved media objects such that a time period associated with the selected portion of the plurality of retrieved media objects does not exceed the time period of presentation.

9. The method of claim 1 wherein the media timeline includes a plurality of regions for arranging media object components of varying classes for generating a multimedia presentation including the media object components, wherein each region corresponds to a class of media object components included in the multimedia presentation.

10. A system for arranging a media object in a media timeline, the system comprising:
    means for presenting a graphical user interface including a media timeline for arranging a plurality of media objects in an order for presentation;
    means for receiving a selection of a portion of the media timeline representing a time period of presentation;
    means for receiving, in a text entry field within the selected portion of the media timeline, a search term for association with the selected portion of the media timeline;
    means for retrieving a media object according to a determination that the media object is related to the search term associated with the selected portion of the media timeline; and
    means for automatically, in response to retrieving the media object, arranging the media object in the selected portion of the media timeline based on the selection of the portion of the media timeline representing the time period of presentation for presentation of the media object during the time period of presentation,
    wherein at least one of the means includes at least one electronic hardware component.

11. A system for arranging a media object in a media timeline, the system comprising system components including:
    a timeline rendering component configured for presenting a graphical user interface including a media timeline for arranging a plurality of media objects in an order for presentation;
    a selection input component configured for receiving a selection of a portion of the media timeline representing a time period of presentation, and configured for receiving, in a text entry field within the selected portion of the media timeline, a search term for association with the selected portion of the media timeline;
    a media retriever component configured for retrieving a media object according to a determination that the media object is related to the search term associated with the selected portion of the media timeline; and
    a timeline content manager component configured for automatically, in response to retrieving the media object, arranging the media object in the selected portion of the media timeline based on the selection of the portion of the media timeline representing the time period of presentation for presentation of the media object during the time period of presentation,
    wherein at least one of the system components includes at least one electronic hardware component.

12. The system of claim 11 including a transition selector component configured for retrieving a transition media object according to a determination that the transition media object is related to the search term associated with the selected portion of the media timeline and metadata associated with an adjoining portion of the media timeline adjoining the selected portion of the media timeline.

13. The system of claim 12 wherein the timeline content manager component is configured for arranging the transition media object in the media timeline between the selected portion of the media timeline and the adjoining portion of the media timeline.

14. The system of claim 11 wherein:
    the selection input component is configured for receiving a search parameter defining a scope of a search for retrieving the media object based on the search term; and
    the media retriever component is configured for performing a search for the media object related to the search term, the search performed according to the search parameter.

15. The system of claim 11 wherein the timeline content manager is configured for determining that a time period associated with the media object is not equal to the time period of presentation represented by the selected portion of the media timeline, and for automatically modifying at least one of the media object and the selected portion of the media timeline based on the selection of the portion of the media timeline representing the time period of presentation such that the time period associated with the media object equals the time period of presentation.

16. The system of claim 11 wherein:
   the selection input component is configured for receiving at least one of a count of media objects and a duration representing a time period less than the time period of presentation for association with the selected portion of the media timeline; and
   the media retriever component is configured for retrieving a plurality of media objects according to at least one of the count of media objects and the duration, wherein each of the retrieved media objects is related to the search term.

17. The system of claim 16 wherein the timeline content manager is configured for determining that a time period associated with the retrieved plurality of media objects is not equal to the time period of presentation represented by the selected portion of the media timeline, and for modifying at least one of the selected portion of the media timeline and one or more of the plurality of retrieved media objects such that the time period associated with the plurality of retrieved media objects is equal to the time period of presentation.

18. The system of claim 16 wherein the timeline content manager is configured for determining that a time period associated with the retrieved plurality of media objects is not equal to the time period of presentation represented by the selected portion of the media timeline, and for selecting a portion of the plurality of retrieved media objects such that the time period associated with the selected portion of the plurality of retrieved media objects does not exceed the time period of presentation.

19. The system of claim 11 wherein the timeline rendering component is configured for presenting a media timeline including a plurality of regions for arranging media object components of varying classes for generating a multimedia presentation including the media object components, and each region corresponds to a class of media object components included in the multimedia presentation.

20. A computer readable medium including a computer program, executable by a machine, for arranging a media object in a media timeline, the computer program comprising executable instructions for:
   presenting a graphical user interface including a media timeline for arranging a plurality of media objects in an order for presentation;
   receiving a selection of a portion of the media timeline representing a time period of presentation;
   receiving, in a text entry field within the selected portion of the media timeline, a search term for association with the selected portion of the media timeline;
   retrieving a media object according to a determination that the media object is related to the search term associated with the selected portion of the media timeline; and
   automatically, in response to retrieving the media object, arranging the media object in the selected portion of the media timeline based on the selection of the portion of the media timeline representing the time period of presentation for presentation of the media object during the time period of presentation.

\* \* \* \* \*